Dec. 7, 1926.

J. F. GALLAGHER ET AL 1,609,618

ROLLER BEARING RETAINER

Filed July 10, 1925

Inventors
James F. Gallagher,
and George C. Noros,

By Blom & Kelleh
Attorneys

Patented Dec. 7, 1926.

1,609,618

UNITED STATES PATENT OFFICE.

JAMES F. GALLAGHER, OF LANCASTER, AND GEORGE C. NOROS, OF MANHEIM, PENNSYLVANIA, ASSIGNORS OF ONE-HALF TO NATIONAL BEARING COMPANY, OF LANCASTER, PENNSYLVANIA, A CORPORATION OF DELAWARE, AND ONE-HALF TO BOND FOUNDRY & MACHINE COMPANY, OF MANHEIM, PENNSYLVANIA, A CORPORATION OF PENNSYLVANIA.

ROLLER-BEARING RETAINER.

Application filed July 10, 1925. Serial No. 42,623.

A principal object of our invention is to provide means for receiving and retaining the rollers of a roller bearing whereby when the rollers are assembled with said means they will be securely maintained in proper relative circumferentially spaced parallel relation with respect to each other, with each roller independently rotatable on its own axis, the retainer and rollers thus forming a unit which can be inserted in or removed from the bearing without danger of the rollers becoming displaced.

A further object of the invention is to provide a retainer for the rollers of roller bearings, and more particularly for that type of rollers which are cylindrical in form and of the same diameter throughout their length, which may be readily and cheaply constructed and assembled with the rollers with a minimum expenditure of labor and time; which, when so assembled, in nowise interferes with the proper operation of the rollers in the bearing; which is light, devoid of loose parts and of such character that it is not likely to become damaged or rendered ineffective to perform its intended function under the conditions of use to which devices of this general character are ordinarily subjected.

Our invention further includes other objects and novel features of design, construction and arrangement hereinafter more particularly described or claimed or which will be apparent from the accompanying drawing in which we have illustrated a preferred embodiment of the invention to which the following description is more especially directed.

Figure 1:
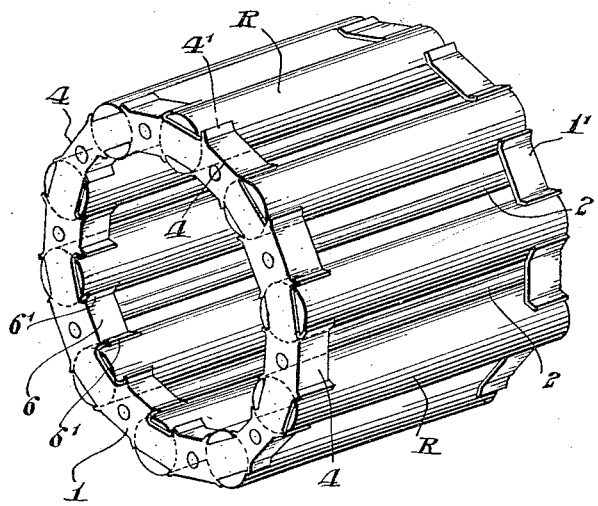
Figure 2:
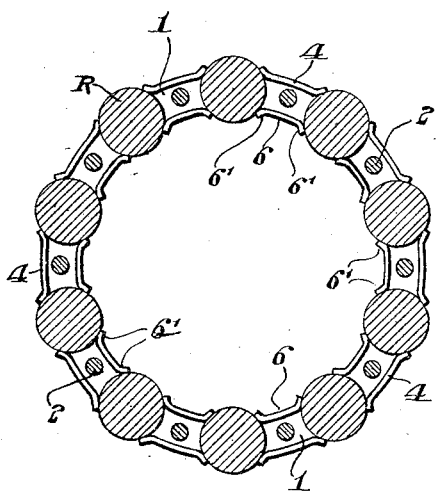
Figure 3:
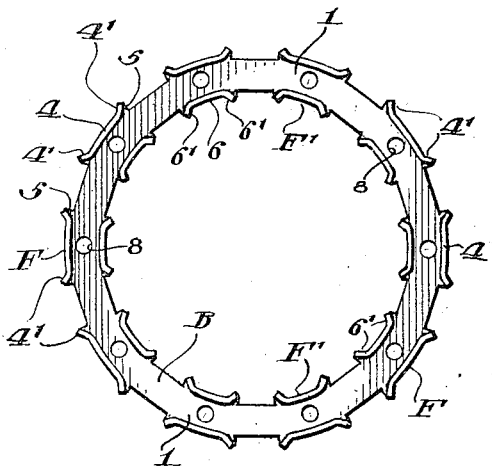
Figure 4:
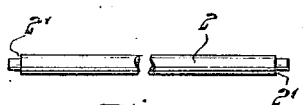

In the drawing Fig. 1 is a perspective view of the retainer assembled with the rollers; Fig. 2 is a transverse section therethrough; Fig. 3 is a plan view of one of the retainer rings before assembly, and Fig. 4 is a side elevation of one of the pillars, also before assembly. Like symbols are used to designate the same parts in the several figures.

In the preferred embodiment shown the assembled retainer consists of a pair of oppositely disposed retainer rings 1, 1' which are in all respects similar to each other and the form of which is hereinafter more particularly described, united by and held in rigid longitudinally spaced position with respect to each other by a plurality of pillars 2 whose ends respectively extend through apertures in the rings and are headed over on the outer faces thereof, these pillars being preferably respectively disposed between the adjacent pairs of rollers R the ends of which are engaged and supported by the retaining rings. The retainer proper, therefore, may be considered as a substantially cylindrical open cage having ends formed by the retaining rings which are tied together by the pillars.

Referring now more particularly to the form and construction of the retainer rings which are preferably struck from sheet metal of suitable thickness, it will be apparent from an inspection of Fig. 3 that each ring consists of a substantially annular flat body B provided on its outer periphery with a series of circumferentially spaced flaps or projections F turned up substantially at right angles to the body and on its inner periphery with a plurality of other flaps or projections F' substantially similar in shape to the first mentioned series but of smaller size, these latter flaps being radially aligned with the outer flaps and also respectively circumferentially spaced from each other. As all of the flaps of each series are similar, a description of any one flap will suffice for the others in that series. Thus, each outer flap comprises a central portion 4 which in planary outline conforms generally to the curvature of the outer edge of the body and end portions 4' each of which from its junction with portion 4 is bent reversely outward and more or less away from the general direction of curvature of the central portion, the whole flap being, of course, disposed substantially at right angles to the plane of the body of the ring.

Each of the inner flaps, generally designated as F', corresponds substantially to the outer flaps already described, having a central portion 6 which generally follows in planary outline the contour of the inner edge of the body and reversely turned end portions 6' which, however, are respectively turned toward the center of the retaining ring instead of away therefrom as in the case of the portions 4'. It is to be noted, however, that the central portion 6 of each inner flap is considerably shorter than the corresponding portion of the adjacent outer flap since the diameter of the inner edge of the ring is considerably less than the diameter of the outer edge, but the reversely turned portions of both the inner and outer flaps may conveniently be of substantially similar size. Thus, the inner faces of the tips of the reversely turned portions of each adjacent pair of inner and outer flaps are substantially tangent to a circle of a diameter slightly greater than the diameter of the ends of the rollers R so that when the latter are disposed between said reversely turned tips they will be free to rotate on their axes yet prevented from material displacement. In order that the surface of the rollers may be free to engage the surfaces between which they are disposed when positioned in the bearing and to maintain the retainer proper out of engagement with the latter when assembled therein, the width of the body of the retainer ring is made somewhat less than the diameter of the rollers and, additionally, the length and disposition of the reversely turned portions of the flaps is so determined that the extremities of the latter will lie slightly below the outer and inner surfaces of the rollers when assembled in the retainer.

It will be noted from an inspection of Fig. 3 that the outer and inner edges of the body between the flaps are not of truly arcuate form but conform more nearly to straight lines and further that a small fillet 5 of the metal generally occurs at the base of each of the reversely turned portions of both the inner and outer flaps, this fillet resulting from the action of the forming tools employed in bending up the flaps from the plane of the body. While this fillet is of some utility in strengthening the flaps it is not necessary for the successful operation of the retainer and if desired the dies may therefore be so formed as to prevent its occurrence.

Each of the retainer rings is provided with a plurality of spaced preferably circular holes 8 for the reception of the ends of the pillars 2, these holes being preferably positioned centrally of the retainer body and midway between the ends of the flaps, while the pillars 2 may be cylindrical in form and conveniently of somewhat greater diameter, save at their ends, than the holes 8. The end of the pillars, however, may be sufficiently reduced in diameter to enter the holes in the retainer rings thus forming shoulders 2' effective to engage the inner face of the adjacent retainer ring when the parts are assembled, the distance between the shoulders being preferably very slightly greater than the length of the rollers with which the retainer is to be used. Thus when the parts are assembled the retainer rings by engagement with the shoulders are held in spaced relation and prevented from engaging the ends of the rollers too closely which might interfere with their proper rotation.

The retainer rings and pillars having been formed substantially as described, the retainer is permanently assembled with the rollers by disposing the ends of the latter in the pockets or spaces formed between the reversely turned portions of the flaps, as best shown in Fig. 1, and securing the rings in position by heading over the extremities of the pillars against the outer faces of the rings. It will be understood that after they are assembled in the retainer it is impossible to remove or displace the rollers therefrom without mutilating the retainer rings or disassembling the entire retainer but that at all times the rollers are free to rotate independently on their axes and are maintained in parallel circumferentially spaced relation with each other. Additionally, the engagement of the inner faces of the rings with the shoulders on the pillars and the upsetting of the ends of the latter against the outer surfaces of the rings produces a retainer of very rigid form and construction although of relatively light weight and that, in consequence, even in the smaller sizes it is very difficult, if not substantially impossible, to spring or twist the retainer or otherwise cause undesirable disalignment of the parts thereof without the exertion of a relatively great amount of force and the subjection of the retainer to strains and stresses in excess of those to which it is ordinarily subjected under operative conditions.

While we have herein described and illustrated with considerable particularity a preferred embodiment of our invention and one which is adapted to be made up in both large and small sizes in conformity with the requirements of various sizes and types of bearings, we do not thereby desire or intend to specifically limit ourselves to any precise details of design, construction and arrangement of the various elements as the same may be modified in minor particulars from the precise embodiments to which we have referred without departing from the spirit and scope of the invention as defined in the appended claim.

Having thus described our invention, we claim and desire to protect by Letters Patent of the United States—

A retainer ring for a roller bearing retainer, formed of sheet metal and comprising a flat annular body, a series of circumferentially spaced outer flaps extending substantially normal to the plane of the body and adjacent the outer edge thereof and a corresponding series of inner flaps also extending substantially normal to the plane of the body and adjacent the inner edge thereof, the flaps of each series being respectively radially aligned with the flaps in the other series and each flap comprising a central portion generally conforming to the curvature of the adjacent edge of the body and reversely angularly outwardly bent end portions, the said central portions of the outer flaps being longer than the corresponding portions of the inner flaps and the end portions of the outer flaps being contiguous to and united with the body and the end portions of the inner flaps projecting circumferentially beyond the edges thereof in spaced relation with the body to embrace and support the rollers, said body being also provided with a series of symmetrically spaced apertures adapted for the reception of means operative to rigidly secure two of said rings in oppositely disposed longitudinally spaced relation.

In witness whereof, we have hereunto set our hands this 8th day of July, 1925.

JAMES F. GALLAGHER.
GEORGE C. NOROS.